(12) United States Patent
AlSahan

(10) Patent No.: US 10,126,155 B1
(45) Date of Patent: Nov. 13, 2018

(54) MULTI-LAYER FLOW AND LEVEL VISUALIZER

(71) Applicant: Saudi Arabian Oil Company, Dhahran (SA)

(72) Inventor: Fawaz A. AlSahan, Riyadh (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/686,302

(22) Filed: Aug. 25, 2017

(51) Int. Cl.
*G01F 1/66* (2006.01)
*G01F 23/296* (2006.01)

(52) U.S. Cl.
CPC .......... *G01F 1/662* (2013.01); *G01F 23/2962* (2013.01)

(58) Field of Classification Search
CPC . G01F 1/662; G01F 23/00; G01F 1/58; G01F 23/29
See application file for complete search history.

(56) References Cited

U.S. PATENT DOCUMENTS

| | | | |
|---|---|---|---|
| 5,719,329 A * | 2/1998 | Jepson | G01F 1/24 73/597 |
| 5,929,342 A * | 7/1999 | Thompson | G01F 1/64 73/861.04 |
| 6,550,345 B1 | 4/2003 | Letton | |
| 6,769,293 B2 | 8/2004 | Zanker | |
| 6,813,962 B2 | 11/2004 | Gysling et al. | |
| 7,171,315 B2 | 1/2007 | Loose | |
| 7,330,797 B2 * | 2/2008 | Bailey | G01F 1/704 702/100 |
| 7,389,187 B2 | 6/2008 | Kersey et al. | |
| 8,109,127 B2 | 2/2012 | Gysling et al. | |
| 8,360,635 B2 * | 1/2013 | Huang | G01F 1/663 374/137 |
| 8,850,871 B2 | 10/2014 | Schaefer et al. | |
| 8,974,114 B2 | 3/2015 | Derr et al. | |
| 9,031,797 B2 * | 5/2015 | Huang | G01F 1/663 702/48 |
| 9,295,923 B2 | 3/2016 | Mezheritsky et al. | |
| 2015/0260558 A1 | 9/2015 | Priyadarshana et al. | |
| 2016/0305805 A1 | 10/2016 | Baumoel | |
| 2016/0320226 A1 * | 11/2016 | Schaefer | G01F 23/2962 |
| 2017/0261357 A1 * | 9/2017 | Wang | G01F 1/58 |

* cited by examiner

*Primary Examiner* — Jewel V Dowtin
(74) *Attorney, Agent, or Firm* — Bracewell LLP; Constance G. Rhebergen; Linda L. Morgan

(57) ABSTRACT

A method and system for measuring a fluid parameter of a fluid within a fluid containment vessel includes mounting a first multi-sensor assembly to a fluid containment vessel, the first multi-sensor assembly having two or more multi-sensor pairs located at consecutive heights of the fluid containment vessel, each of the two or more multi-sensor pairs having a first multi-sensor and an opposite second multi-sensor, each of the two or more multi-sensor pairs being in communication with a single transmitter assembly. A signal is sent from the first multi-sensor towards the second multi-sensor of the two or more multi-sensor pairs. A transit time for the signal to pass between the first multi-sensor and the second multi-sensor is measured. The transit time of adjacent multi-sensor pairs is compared to identify a fluid boundary within the fluid containment vessel.

23 Claims, 3 Drawing Sheets

MULTI-LAYER FLOW AND LEVEL VISUALIZER

BACKGROUND

1. Field of the Disclosure

The present disclosure relates in general to fluid parameter measurement, and more particularly to measuring a level or flow of fluid in a fluid containment vessel.

2. Description of the Related Art

In the hydrocarbon development industry there are times when measuring fluids within fluids containment vessels can be challenging. As an example, tanks and pipelines can contain single or multi-layered fluids and it can be desirable to determine both the level and flow measurement each of type of fluid. There can be, for example, multiple fluid interfaces with an emulsion layer in a desalter or dehytreater, a partially filled pipe with a single type of fluid, two parallel fluids flowing within a pipe, such as for a burn pit application, or an unknown water level in a gas tank.

Some current methods for determining fluid type, fluid level, and fluid flow within a fluid containment vessel are complicated and expensive and require multiple types of sensors.

SUMMARY OF THE DISCLOSURE

Embodiments of this disclosure provide methods and systems for determining a type of fluid, calculating interface levels for multi layers of liquids, and determining the flow of parallel gas and liquid streams. The methods and systems can be used, for example, for fully or partially filed pipelines or in single or multi-fluid tanks. Multi-sensor pairs that will provide standalone measurements are installed in a pattern stacked above each other in a single system that combines the readings of these many ultrasonic sensors to provide a universal solution for multiple and challenging flow and level applications in the oil and gas industry.

In an embodiment of this disclosure, a method of measuring a fluid parameter of a fluid within a fluid containment vessel includes mounting a first multi-sensor assembly to a fluid containment vessel, the first multi-sensor assembly having two or more multi-sensor pairs located at consecutive heights of a fluid containment vessel, each of the two or more multi-sensor pairs having a first multi-sensor and an opposite second multi-sensor, each of the two or more multi-sensor pairs being in communication with a single transmitter assembly. A signal is sent from the first multi-sensor towards the second multi-sensor of the two or more multi-sensor pairs. A transit time for the signal to pass between the first multi-sensor and the second multi-sensor is measures and the transit time of adjacent multi-sensor pairs is compared to identify a fluid boundary within the fluid containment vessel.

In alternate embodiments, the method can further include utilizing the transit time of one of the two or more multi-sensor pairs to determine a sound velocity of the fluid and identify the type of the fluid at the elevation of such of the two or more multi-sensor pairs. The fluid containment vessel can be a pipeline and the first multi-sensor of each of the two or more multi-sensor pairs can be downstream of the second multi-sensor. A signal can be sent from the second multi-sensor towards the first multi-sensor of the two or more multi-sensor pairs. The two or more multi-sensor pairs can measure a flow of the fluid at an elevation of the two or more multi-sensor pairs. The measured flow of a phase of the fluid can be averaged to determine an overall flow of the phase of the fluid.

In other alternate embodiments, the two or more multi-sensor pairs can be installed internally within the fluid containment vessel or alternately, the two or more multi-sensor pairs can be installed externally of the fluid containment vessel. The fluid within the fluid containment vessel can be selected from a group consisting of a gas only, a liquid only, and a layered gas and liquid. A second multi-sensor assembly can be mounted to the fluid containment vessel, wherein the first multi-sensor assembly can measure a parameter of a liquid and the second multi-sensor assembly can measure a parameter of a gas.

In another embodiment of this application, a method of measuring a level of a fluid within a fluid containment vessel can include spacing a plurality of multi-sensor pairs at successive elevations along a height of a fluid containment vessel, each of the multi-sensor pairs having a first multi-sensor and an opposite second multi-sensor, each of the multi-sensor pairs being in communication with a single transmitter assembly. A signal is sent from the first multi-sensor towards the second multi-sensor of each of the multi-sensor pairs. A transit time for the signal to pass between the first multi-sensor and the second multi-sensor is measured. The transit time is used to identify a fluid type at each pair of multi-sensors. The transit time at adjacent elevations is compared to identify a level of the fluid within the fluid containment vessel.

In alternate embodiments, the fluid containment vessel can be a pipeline and the first multi-sensor of each of the multi-sensor pairs is downstream of the second multi-sensor. The method can further include sending a signal from the second multi-sensor towards the first multi-sensor of each of the multi-sensor pairs to measure a flow of the fluid at an elevation of each of the multi-sensor pairs. The measured flow of each type of the fluid can be averaged to determine an overall flow of such type of the fluid. Each of the multi-sensor pairs can be installed internally within the fluid containment vessel. Each of the multi-sensor pairs can be installed externally of the fluid containment vessel. The fluid type can be a gas or a liquid.

In yet another alternate embodiment of this disclosure, a system for measuring a fluid parameter within a fluid containment vessel can have a first multi-sensor assembly having two or more multi-sensor pairs arranged in consecutive heights of a fluid containment vessel, each of the two or more multi-sensor pairs having a first multi-sensor and an opposite second multi-sensor. The multi-sensor pairs are arranged in communication with a single transmitter. Each of the multi-sensor pairs are operable to send a signal from the first multi-sensor towards the second multi-sensor of the two or more multi-sensor pairs for measuring a transit time for the signal to pass between the first multi-sensor and the second multi-sensor so that comparison of the transit time of adjacent multi-sensor pairs identify a fluid boundary within the fluid containment vessel.

In alternate embodiments, the transmitter can be operable to determine a sound velocity of the fluid and identify the type of the fluid at the elevation of such of the two or more multi-sensor pairs from the transit time of one of the two or more multi-sensor pairs. If fluid containment vessel is a pipeline the first multi-sensor of each of the two or more multi-sensor pairs can be downstream of the second multi-sensor, and the second multi-sensor can be operable to send a signal towards the first multi-sensor. The transmitter can be operable to determine a flow of the fluid at an elevation of the two or more multi-sensor pairs from the transit time of one of the two or more multi-sensor pairs. The two or more multi-sensor pairs can be installed internally within the fluid containment vessel. The two or more multi-sensor pairs can be installed externally of the fluid containment vessel. A second multi-sensor assembly can be included, wherein the first multi-sensor assembly is operable to measure a parameter of a liquid and the second multi-sensor assembly is operable to measure a parameter of a gas.

BRIEF DESCRIPTION OF THE DRAWINGS

So that the manner in which the above-recited features, aspects and advantages of the disclosure, as well as others that will become apparent, are attained and can be understood in detail, a more particular description of the embodiments of the disclosure briefly summarized above may be had by reference to the embodiments thereof that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION

Figure 2:
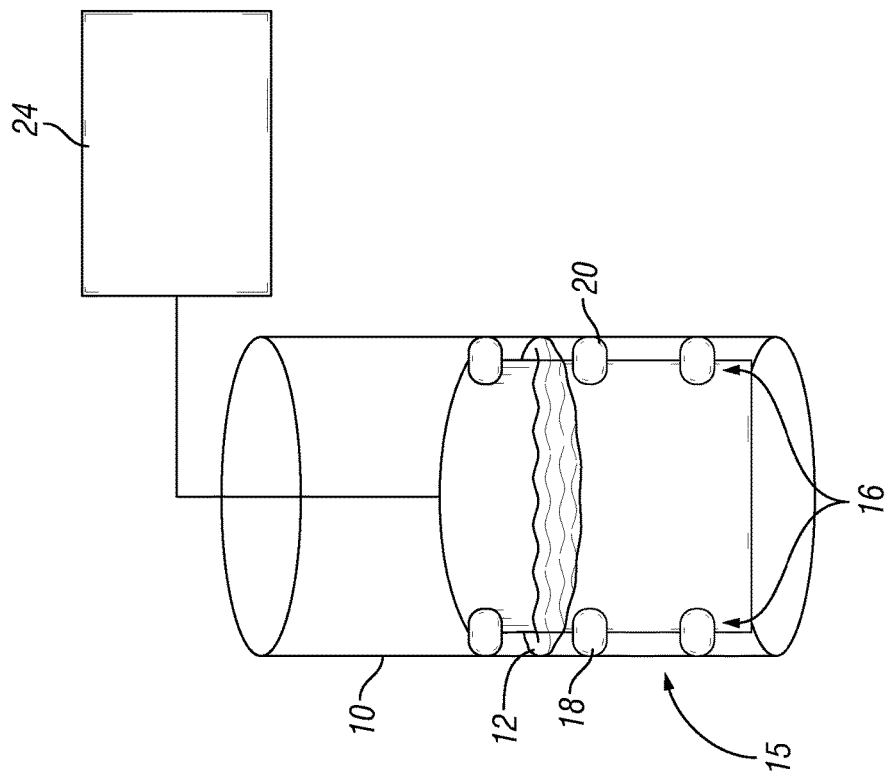
FIG. 2 is a schematic perspective view of a fluid container with an external fluid measurement system, in accordance with an embodiment of this disclosure, with the fluid measurement system configured to measure a fluid level.

The Specification, which includes the Summary of Disclosure, Brief Description of the Drawings and the Detailed Description, and the appended Claims refer to particular features (including process or method steps) of the disclosure. Those of skill in the art understand that the disclosure includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the meaning commonly understood by one of ordinary skill in the art to which this disclosure relates unless defined otherwise.

As used in the Specification and appended Claims, the singular forms "a", "an", and "the" include plural references unless the context clearly indicates otherwise. As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Spatial terms describe the relative position of an object or a group of objects relative to another object or group of objects. The spatial relationships apply along vertical and horizontal axes. Orientation and relational words including "uphole" and "downhole"; "above" and "below" and other like terms are for descriptive convenience and are not limiting unless otherwise indicated.

Where the Specification or the appended Claims provide a range of values, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the Specification and appended Claims to a method comprising two or more defined steps, the defined steps can be carried out in any order or simultaneously except where the context excludes that possibility.

Looking at FIGS. 1-4, fluid containment vessel 10 can be, for example a tank (FIGS. 1-2), a pipeline (FIG. 3-4), or other type of container or flow line that holds or carries fluid. Fluid containment vessel 10 can either hold a given amount of fluid, or can be a conduit through which fluid flows.

The fluid within fluid containment vessel 10 can be a gas, a liquid, or a layered gas and liquid. The liquid can be, for example a hydrocarbon fluid, water, a mixed hydrocarbon and water, or other type of single or mixed liquid product. Embodiments of this disclosure measure the total amount of fluid and not the details of any of the separate liquids that might make up the liquid layer. The gas can be, for example, a hydrocarbon gas, steam, a mixed hydrocarbon and steam, or other type of single or mixed gaseous product. Embodiments of this disclosure measure the total amount of gas and not the details of any of the separate gases that might make up the gas layer. A layered fluid can include a layer of any of the gases and a separate layer of any of the liquids. The layers of the layered fluid can include a similar product in a different phase. For example, the liquid can be water and the gas can be steam or the liquid can be liquid hydrocarbons and the gas can be a gaseous hydrocarbon or the liquid can be a mix of hydrocarbon with water mix and the gas can be a steam with hydrocarbon gas mix. In other embodiments, the two types of fluids can be different products. For example, the liquid can be water and the gas can be a hydrocarbon gas, or the liquid can be liquid hydrocarbon and the gas can be a steam.

Figure 1:
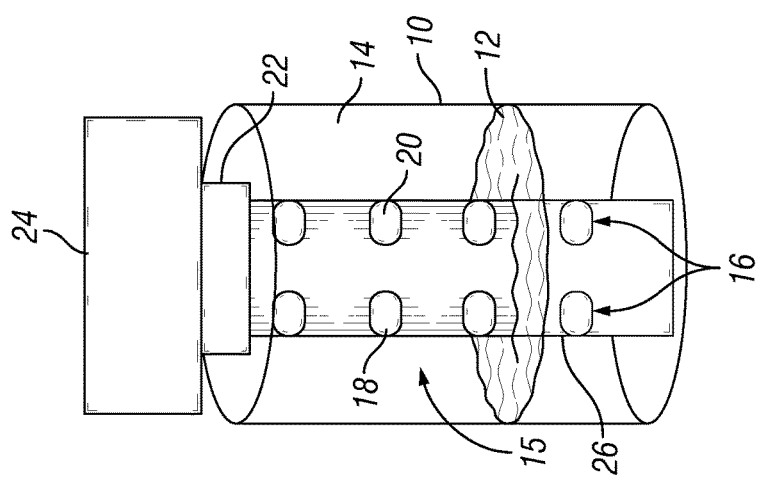
FIG. 1 is a schematic perspective view of a fluid container with an internal fluid measurement system, in accordance with an embodiment of this disclosure, with the fluid measurement system configured to measure a fluid level.

Looking at the example embodiment of FIG. 1, fluid containment vessel 10 is a tank that contains a layered fluid with two types of fluids. A bottom layer of fluid containment vessel 10 can be an amount of liquid 12 and an upper layer of fluid containment vessel 10 can be a gas 14. In the alternate embodiment of FIG. 2, fluid containment vessel 10 is a tank that is partially filled with an amount of liquid 12. In the embodiment of FIG. 3, fluid containment vessel 10 is a pipeline that contains a layered fluid with two types of fluids. A bottom layer of fluid containment vessel 10 can be an amount of liquid 12 and an upper layer of fluid containment vessel 10 can be a gas 14. In the alternate embodiment of FIG. 4, fluid containment vessel 10 is a pipeline that is partially filled with an amount of liquid 12.

In order to determine the amount of fluids within liquid containment vessel 10, a multi-sensor assembly 15 can be used. Multi-sensor assembly 15 includes a plurality of multi-sensor pairs 16 located at consecutive heights of fluid containment vessel 10. In certain embodiments, there can be two or more multi-sensor pairs 16. In the example embodiment of FIGS. 1 and 3, four multi-sensor pairs are shown. In the example embodiment of FIGS. 2 and 4, three multi-sensor pairs 16 are shown. The number of sensors used in embodiments of this disclosure will depend on the overall height of the fluid containment vessel 10. In the example embodiment of FIGS. 1-2, the height of fluid containment vessel 10 is the vertical height of the tank. In the example embodiment of FIGS. 3-4, the height of fluid containment vessel 10 is the diameter of the pipe. The more multi-sensor pairs 16 that are used, the closer together the consecutive multi-sensor pairs 16 will be, leading to higher accuracy results.

Each of the two or more multi-sensor pairs 16 has a first multi-sensor 18 and an opposite second multi-sensor 20. The multi-sensor pairs 16 are stacked above each other and spaced apart at successive elevations along the height of fluid containment vessel 10. Each first multi-sensor 18 and second multi-sensor 20 can be a commonly available ultrasonic sensor. Each first multi-sensor 18 and second multi-sensor 20 can measure sound velocity in a fluid so that a level of fluid can be determined. In certain embodiments where a flow measurement is also determined, each first multi-sensor 18 and second multi-sensor 20 can also measure a fluid flow.

If multi-sensor pairs 16 can perform the required measurements in both a liquid and a gas, then only one multi-sensor assembly 15 is utilized. In alternate embodiments, one multi-sensor assembly 15 can perform the required measurements in the liquid and a second multi-sensor assembly 15 can perform the required measurements in the gas. In embodiments of this disclosure, only ultrasonic multi-sensors are used and the systems and methods are free of other sensors, such as free of electromagnetic sensors, doppler sensors, velocity sensors, or pressure sensors. In alternate embodiments, multi-sensor assembly 15 could include a temperature sensor so that the measurements taken by multi-sensor assembly 15 can be temperature compensated.

Figure 5:
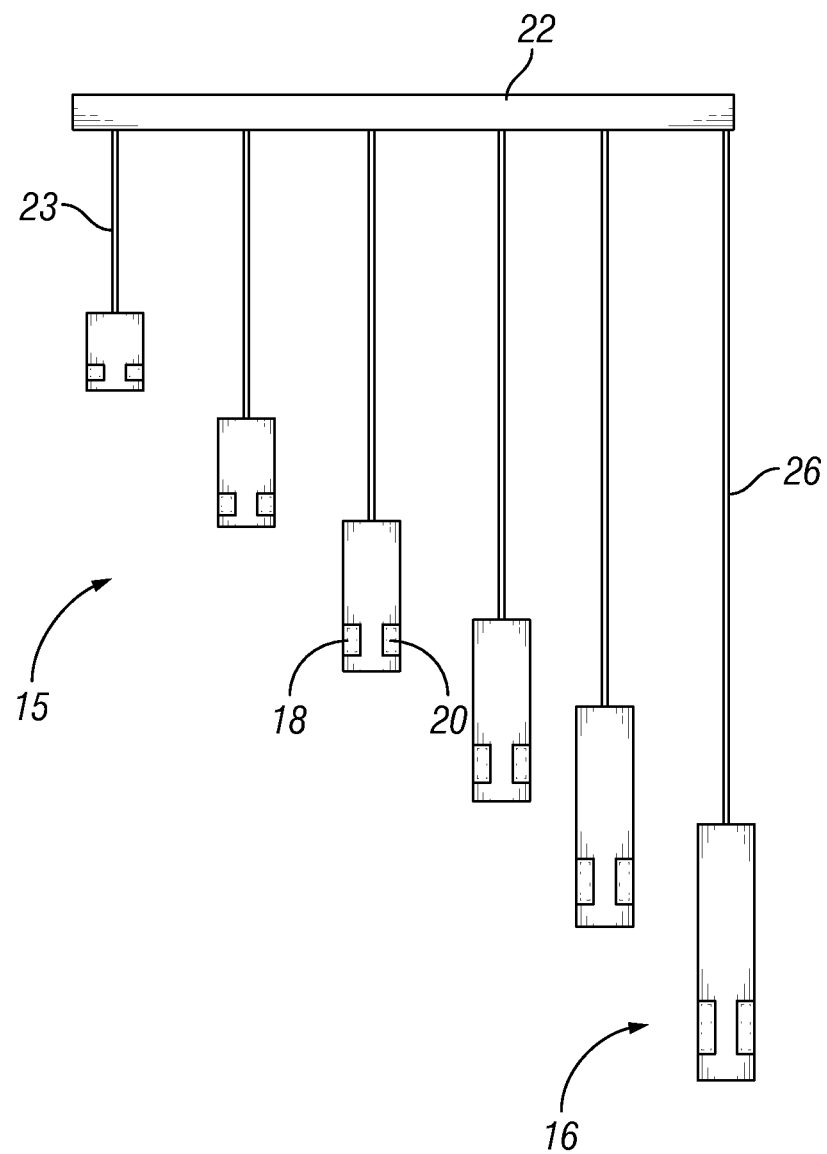
FIG. 5 is a schematic elevation view of a flange supporting multi-sensor pairs, in accordance with an embodiment of this disclosure.

The multi-sensor pairs 16 of multi-sensor assembly 15 are combined into one internally-mounted or externally-mounted system. Looking at FIGS. 1, 3 and 5, multi-sensor pairs 16 can be installed internally within fluid containment vessel 10. In such an embodiment, flange 22 can provide mechanical support for multi-sensor pairs 16 and multi-sensor pairs 16 form a ladder-like shape. Mechanical support members 23 can house communication lines 26. Mechanical support member 23 can be, for example, a rigid metal rod. For top-mounted multi-sensor pairs 16, one flange 22 can be used to connect the arrangement of multi-sensor pairs. For side mounted multi-sensor pairs, each sensor can have its own flange 22 to connect to fluid containment vessel 10.

Figure 4:
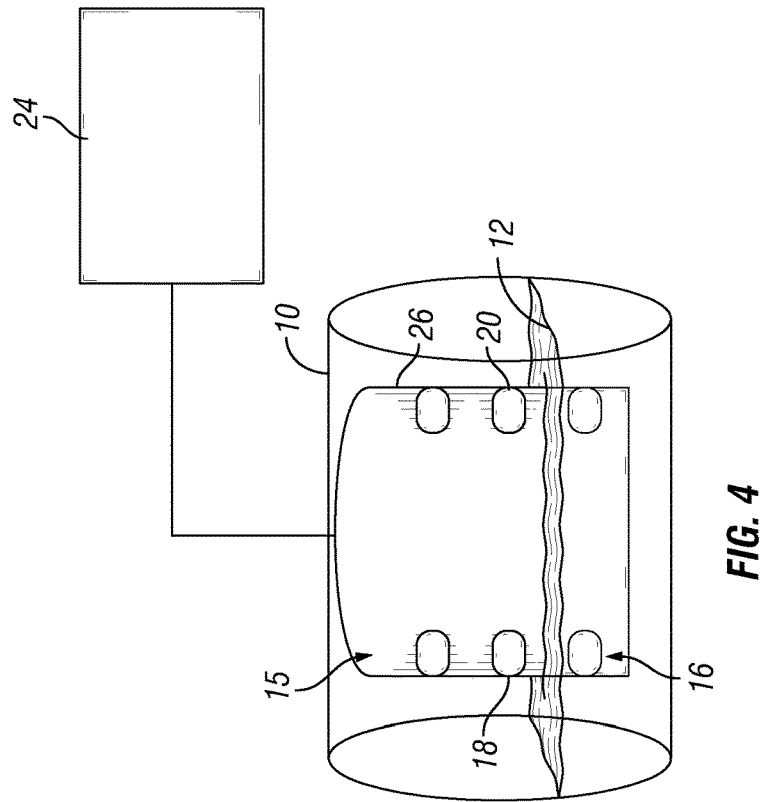
FIG. 4 is a schematic perspective view of a fluid flow line with an external fluid measurement system, in accordance with an embodiment of this disclosure, with the fluid measurement system configured to measure a fluid level and a fluid flow.
Figure 3:
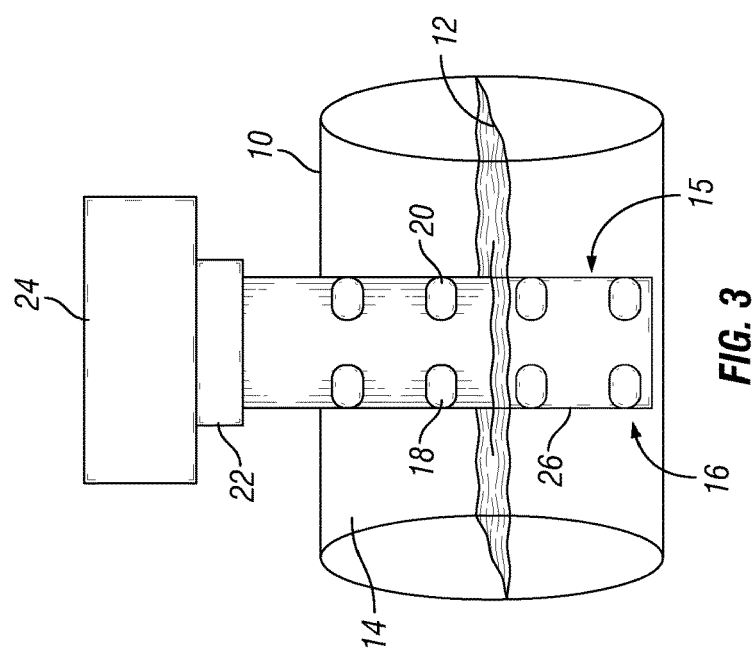
FIG. 3 is a schematic perspective view of a fluid flow line with an internal fluid measurement system, in accordance with an embodiment of this disclosure, with the fluid measurement system configured to measure a fluid level and a fluid flow.

Looking at FIGS. 2 and 4, multi-sensor pairs 16 can be installed externally of fluid containment vessel 10. In such an embodiment, multi-sensor pairs 16 can be installed on the outer surface of fluid containment vessel 10 with first multi-sensor 18 located on a first side of fluid containment vessel 10 and second multi-sensor 20 located on the opposite side of fluid containment vessel 10. First multi-sensors 18 and second multi-sensors 20 can either be clamped entirely outside the surface of fluid containment vessel 10, or can protrude into fluid containment vessel 10. First multi-sensors 18 and second multi-sensors 20 can be clamped to the outside of fluid containment vessel 10 with, for example, a metal clamp or other attachment fixture.

Each of the multi-sensor pairs 16 are in communication with a single transmitter assembly 24. Each of the multi-sensor pairs 16 can be in communication with transmitter assembly 24 by way of communication lines 26. In certain embodiments, each of the multi-sensor pairs 16 are in parallel communication with a single transmitter assembly 24. In alternate embodiments, each multi-sensor pair can separately send a signal to transmitter assembly 24. In alternate embodiments, each of the multi-sensor pairs 16 can be remotely connected to transmitter assembly 24. Transmitter assembly 24 can include a traditional transmitter or multiplexer. Transmitter assembly 24 can further include a display, computer hardware and software, and a control system, each of which are in communication by way of digital, analog, or wireless means. Transmitter assembly 24 can collect the signals, process and display all of the readings and diagnostics data. Transmitter assembly 24 has the capability to read the health status of each first multi-sensors 18 and second multi-sensor 20 and can read the sound velocity from each multi-sensor pairs 16 to determine the fluid level, and the read sound velocity, the gas flow and the liquid flow to determine the fluid flow measurement.

In order to identify a fluid interface or determine a level of fluid within fluid containment vessel 10, a signal can be sent from first multi-sensor 18 towards second multi-sensor 20 of the more multi-sensor pairs 16. The transit time for the signal to pass between each first multi-sensor 18 and its respective second multi-sensor 20 can be measured. The transit time measure at the elevation of each multi-sensor pair 16 can be transmitted separately to transmitter assembly 24. From the transit time, transmitter assembly 24 is operable to determine a sound velocity of the fluid and to identify the type of the fluid at the elevation of each of the multi-sensor pairs 16. Charts providing the sound velocity of various fluids is readily available and such information can be utilized to determine the type of fluid at the elevation of each of the multi-sensor pairs 16 from the transit time. Transmitter assembly 24 can indicate the total level and the different interface points inside fluid containment vessel 10.

The transit time or sound velocity of adjacent multi-sensor pairs 16 can be compared to identify a fluid boundary within fluid containment vessel 10. As an example, starting with a lowermost multi-sensor pair 16, if the transit time or sound velocity of the fluid remains constant between a first multi-sensor pair 16 and the adjacent multi-sensor pair 16, the fluid type of phase at the elevation of the adjacent multi-sensor pair 16 is the same as the fluid type or phase of the first multi-sensor pair 16. If the if the transit time or sound velocity of the fluid changes between the first multi-sensor pair 16 and the adjacent multi-sensor pair 16, the fluid type of phase at the elevation of the adjacent multi-sensor pair 16 is different than the fluid type or phase of the first multi-sensor pair 16. In this way, the interface between fluid types can be located.

After the location of the interface is identified, the amount of each applicable fluid can be calculated by using the location of the interface and the known geometry of fluid containment vessel 10 to determine the volume of fluid containment vessel 10 occupied by such fluid. When measuring a fluid interface, first multi-sensor 18 and its respective second multi-sensor 20 can be located directly across fluid containment vessel 10 from each other or can be located upstream or downstream relative to each other if fluid containment vessel 10 is a fluid flow line, such as a pipeline.

When fluid containment vessel 10 is a fluid flow line, such as a pipeline, each multi-sensor pair 16 can measure fluid flow in addition to the transit time. In such an embodiment, first multi-sensor 18 is located upstream or downstream of second multi-sensor 20. A signal is sent from a signal from first multi-sensor 18 to downstream second multi-sensor 20 and in addition, a signal is sent from second multi-sensor 20 towards first multi-sensor 18 of each multi-sensor pairs 16. In such an embodiment, the signal is a fluid flow measurement used to measure a flow of the fluid at an elevation of each of the multi-sensor pairs 16. The measured flow of each type of the fluid, as determined by the identification on the fluid interface, is used to determine an overall flow of such type of the fluid. By averaging the measured flow of a phase of the fluid, an overall flow of the phase or type of the fluid can be determined. As an example, the multi-sensor pairs 16 in the gas phase can be averaged together to measure the gas flow, and the multi-sensor pairs 16 in the liquid phase can be averaged together to measure the liquid flow. Transmitter assembly 24 can display one or both of the averaged flow of gas and averaged flow of liquid.

Where there are both liquids and gasses in fluid containment vessel 10, first multi-sensors 18 and second multi-sensors 20 are suitable to measure the flow of both liquids and gases. In alternate embodiments a separate liquid sensor and gas sensor are mounted adjacent to each other at the same elevation within fluid containment vessel 10. In other alternate embodiments, multi-sensor pairs 16 can include temperature sensors that can provide a temperature measurement.

Embodiments of this disclosure therefore disclose systems and methods for determining a flow measurement in a partially filled pipe, such as a treated water returning to the sea, a flow measurement of two parallel fluids phases, such as for a burn pit where liquid and gas are separated and run in parallel, a level measurement including a total flow and multi interface point, level and interface measurement and detection for tanks and vessels with emulsion layers such as for desalters and dehydrators, and a water level internal measurement and detection inside hydrocarbon tanks, such as for dewatering applications.

Embodiments described herein, therefore, are well adapted to carry out the objects and attain the ends and advantages mentioned, as well as others inherent therein. While certain embodiments have been described for purposes of disclosure, numerous changes exist in the details of procedures for accomplishing the desired results. These and other similar modifications will readily suggest themselves to those skilled in the art, and are intended to be encompassed within the scope of the present disclosure disclosed herein and the scope of the appended claims.

What is claimed is:

1. A method of measuring a fluid parameter of a fluid within a fluid containment vessel, the method including:

mounting a first multi-sensor assembly to a fluid containment vessel, the first multi-sensor assembly having two or more multi-sensor pairs located at consecutive heights of the fluid containment vessel, each of the two or more multi-sensor pairs having a first multi-sensor and an opposite second multi-sensor, each of the two or more multi-sensor pairs being in communication with a single transmitter assembly;

sending a signal from the first multi-sensor towards the second multi-sensor of the two or more multi-sensor pairs;

measuring a transit time for the signal to pass between the first multi-sensor and the second multi-sensor; and comparing the transit time of adjacent multi-sensor pairs to identify a fluid boundary within the fluid containment vessel.

2. The method of claim 1, further including utilizing transit time of one of the two or more multi-sensor pairs to determine a sound velocity of the fluid and identify a type of the fluid at an elevation of such of the two or more multi-sensor pairs.

3. The method of claim 1, wherein the fluid containment vessel is a pipeline and the first multi-sensor of each of the two or more multi-sensor pairs is downstream of the second multi-sensor.

4. The method of claim 3, further including sending a signal from the second multi-sensor towards the first multi-sensor of the two or more multi-sensor pairs.

5. The method of claim 4, wherein the two or more multi-sensor pairs measure a flow of the fluid at an elevation of the two or more multi-sensor pairs.

6. The method of claim 5, further including averaging a measured flow of a phase of the fluid to determine an overall flow of the phase of the fluid.

7. The method of claim 1, wherein the two or more multi-sensor pairs are installed internally within the fluid containment vessel.

8. The method of claim 1, wherein the two or more multi-sensor pairs are installed externally of the fluid containment vessel.

9. The method of claim 1, wherein the fluid within the fluid containment vessel is selected from a group consisting of a gas only, a liquid only, and a layered liquid and gas.

10. The method of claim 1, further including mounting a second multi-sensor assembly to the fluid containment vessel, wherein the first multi-sensor assembly measures a parameter of a liquid and the second multi-sensor assembly measures a parameter of a gas.

11. A method of measuring a level of a fluid within a fluid containment vessel, the method including:

spacing a plurality of multi-sensor pairs at successive elevations along a height of a fluid containment vessel, each of the multi-sensor pairs having a first multi-sensor and an opposite second multi-sensor, each of the multi-sensor pairs being in communication with a single transmitter assembly;

sending a signal from the first multi-sensor towards the second multi-sensor of each of the multi-sensor pairs;

measuring a transit time for the signal to pass between the first multi-sensor and the second multi-sensor;

using the transit time to identify a fluid type at each pair of multi-sensors; and comparing the transit time at adjacent elevations to identify a level of the fluid within the fluid containment vessel.

12. The method of claim 11, wherein the fluid containment vessel is a pipeline and the first multi-sensor of each of the multi-sensor pairs is downstream of the second multi-sensor, the method further including sending a signal from the second multi-sensor towards the first multi-sensor of each of the multi-sensor pairs to measure a flow of the fluid at an elevation of each of the multi-sensor pairs.

13. The method of claim 12, further including averaging a measured flow of each type of the fluid to determine an overall flow of such type of the fluid.

14. The method of claim 11, wherein each of the multi-sensor pairs are installed internally within the fluid containment vessel.

15. The method of claim 11, wherein each of the multi-sensor pairs are installed externally of the fluid containment vessel.

16. The method of claim 11, wherein the fluid type is a gas or a liquid.

17. A system for measuring a fluid parameter within a fluid containment vessel, the system having:
- a first multi-sensor assembly having two or more multi-sensor pairs arranged in consecutive heights of a fluid containment vessel, each of the two or more multi-sensor pairs having a first multi-sensor and an opposite second multi-sensor; wherein
- the multi-sensor pairs are arranged in communication with a single transmitter assembly; and
- each of the multi-sensor pairs are operable to send a signal from the first multi-sensor towards the second multi-sensor of the two or more multi-sensor pairs for measuring a transit time for the signal to pass between the first multi-sensor and the second multi-sensor so that comparison of the transit time of adjacent multi-sensor pairs identify a fluid boundary within the fluid containment vessel.

18. The system of claim 17, wherein the transmitter assembly is operable to determine a sound velocity of a fluid and identify a type of the fluid at an elevation of such of the two or more multi-sensor pairs from the transit time of one of the two or more multi-sensor pairs.

19. The system of claim 17, wherein the fluid containment vessel is a pipeline, the first multi-sensor of each of the two or more multi-sensor pairs is downstream of the second multi-sensor, and the second multi-sensor is operable to send a signal towards the first multi-sensor.

20. The system of claim 19, wherein assembly is operable to determine a flow of a fluid at an elevation of the two or more multi-sensor pairs from the transit time of one of the two or more multi-sensor pairs.

21. The system of claim 17, wherein the two or more multi-sensor pairs are installed internally within the fluid containment vessel.

22. The system of claim 17, wherein the two or more multi-sensor pairs are installed externally of the fluid containment vessel.

23. The system of claim 17, further including a second multi-sensor assembly, wherein the first multi-sensor assembly is operable to measure a parameter of a liquid and the second multi-sensor assembly is operable to measure a parameter of a gas.

* * * * *